US009302553B2

(12) United States Patent
Ninomiya et al.

(10) Patent No.: US 9,302,553 B2
(45) Date of Patent: Apr. 5, 2016

(54) PNEUMATIC TIRE (71) Applicant: Sumitomo Rubber Industries, Ltd., Kobe-shi, Hyogo (JP)

(72) Inventors: Hiroaki Ninomiya, Kobe (JP); Satoshi Iwasaki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 185 days.

(21) Appl. No.: 14/022,953

(22) Filed: Sep. 10, 2013

(65) Prior Publication Data
US 2014/0230982 A1 Aug. 21, 2014

(30) Foreign Application Priority Data

Feb. 21, 2013 (JP) .................................. 2013-032367

(51) Int. Cl.
*B60C 11/11* (2006.01)
*B60C 11/13* (2006.01)
*B60C 11/12* (2006.01)
*B60C 11/03* (2006.01)

(52) U.S. Cl.
CPC ......... *B60C 11/1369* (2013.04); *B60C 11/0306* (2013.04); *B60C 11/12* (2013.01); *B60C 2011/0346* (2013.04); *B60C 2011/0365* (2013.04); *B60C 2011/0369* (2013.04); *B60C 2011/0372* (2013.04); *B60C 2011/0381* (2013.04)

(58) Field of Classification Search
CPC .............. B60C 11/0306; B60C 11/113; B60C 2011/0372; B60C 11/11; B60C 11/13
See application file for complete search history.

(56) References Cited

U.S. PATENT DOCUMENTS

| 4,412,576 | A | * | 11/1983 | Nakajima | ................ | 152/209.18 |
| D647,034 | S | * | 10/2011 | Iwasaki | ........................ | D12/586 |
| D647,465 | S | * | 10/2011 | Iwasaki | ........................ | D12/586 |
| 8,844,593 | B2 | * | 9/2014 | Kami | ....................... | 152/209.18 |
| 2004/0020577 | A1 | | 2/2004 | Hirai | | |
| 2012/0222788 | A1 | * | 9/2012 | Nishiwaki | ................ | 152/209.18 |
| 2013/0192731 | A1 | * | 8/2013 | Oji | ............................ | 152/209.8 |

FOREIGN PATENT DOCUMENTS

EP 0 654 365 A1 5/1995
JP 2012-218652 A 11/2012

* cited by examiner

*Primary Examiner* — Steven D Maki
*Assistant Examiner* — Robert Dye
(74) *Attorney, Agent, or Firm* — Birch, Stewart, Kolasch & Birch, LLP (57) ABSTRACT

A pneumatic tire includes a tread portion provided with a pair of center main grooves and a pair of shoulder main grooves to define a center portion, a pair of middle portions, and a pair of shoulder portions. The shoulder main grooves extend in a trapezoid wave manner that includes a circumferentially extending axially outer part, an axially inner part arranged axially inwardly of the axially outer part, and an inclined part connecting between the axially outer and inner parts. The shoulder portion is provided with shoulder lateral grooves extending from the shoulder main groove to a tread edge to define a plurality of shoulder blocks. Each shoulder lateral groove has its axially inner end connected to the axially outer part of the shoulder main groove so as to include an outer corner point between the axially outer part and the inclined part.

1 Claim, 5 Drawing Sheets

PNEUMATIC TIRE

BACKGROUND OF THE INVENTION

1. Field of the Invention

The present invention relates to a pneumatic tire, and in particular, relates to a pneumatic tire used for traveling on muddy roads.

2. Description of the Related Art

Four-wheel drive vehicles usually travel on not only dry asphalt roads, but also muddy roads. Therefore, tires for four-wheel drive vehicles are generally requested to have noise performance that offers silence for passengers on dry roads in addition to muddy road performance that offers high traction force on uneven ground such as loose muddy roads.

Japanese Unexamined Patent Application Publication No. 2012-218652 discloses a pneumatic tire that is expected to have a superior noise performance as well as muddy road performance.

Figure 5:
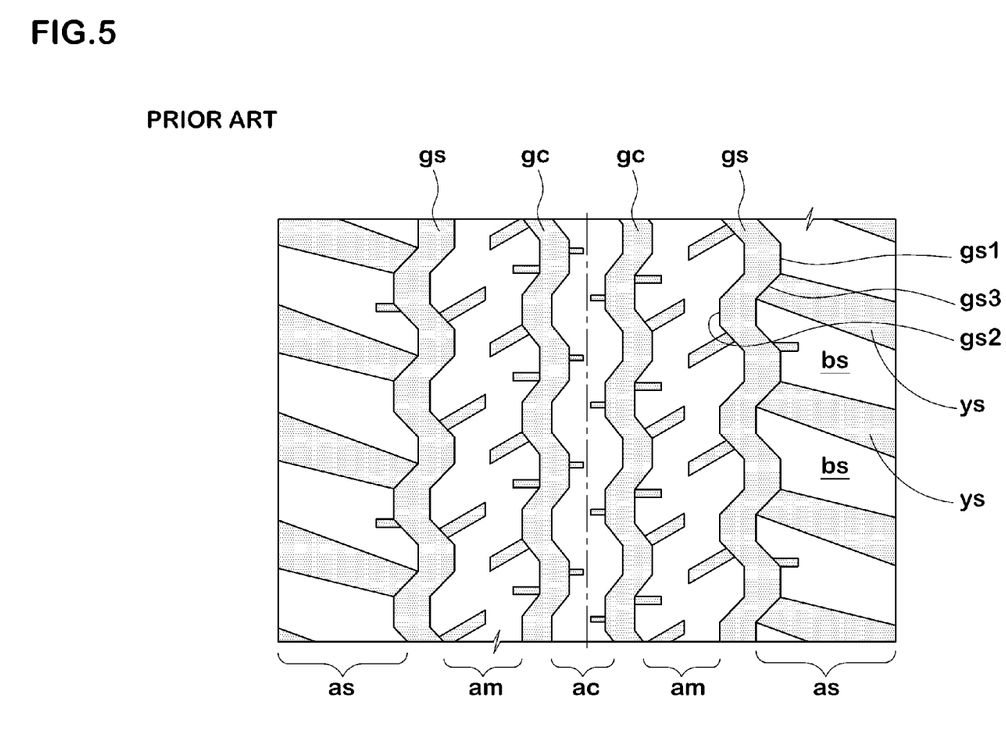
FIG. 5 is a development view of a conventional tread portion of a pneumatic tire.

FIG. 5 illustrates a developed view of the tread portion of the tire mentioned above. Referring to FIG. 5, the tread portion is provided with a pair of center main grooves "gc", "gc", and a pair of shoulder main grooves "gs", "gs" arranged axially outwardly of the center main grooves "gc" to divide it into a center portion "ac", a pair of middle portions "am", and a pair of shoulder portions "as". The shoulder portion "as" is provided with a plurality of shoulder lateral grooves "ys" to divide it into a plurality of shoulder blocks "bs". The shoulder main groove "gs" extends in a trapezoid wave manner that includes a circumferentially extending axially outer part "gs1", a circumferentially extending axially inner part "gs2" arranged axially inwardly of the axially outer part "gs1", and an inclined part "gs3" connecting between the axially outer part "gs1" and the axially inner part "gs2".

The shoulder lateral groove ys has an inclination angle in a range of from 5 to 20 degrees with respect to an axial direction of the tire, and is connected to the shoulder main groove gs at the inclined part gs3.

However, such a tire disclosed above has room for improving noise performance on dry roads.

SUMMARY OF THE INVENTION

The present invention has been worked out in light of the circumstances described above, and has a main object of providing a pneumatic tire having an improved muddy road performance while maintaining noise performance.

According to one aspect of the present invention, there is provided a pneumatic tire including a tread portion provided with a pair of circumferentially and continuously extending center main grooves to define a center portion therebetween, a pair of circumferentially and continuously extending shoulder main grooves disposed axially outwardly of the center main grooves to define a middle portion between the center main groove and the shoulder main groove and a shoulder portion between the shoulder main groove and a tread edge, in each side of a tire equator. The shoulder main grooves extend in a trapezoid wave manner that comprises a circumferentially extending axially outer part, a circumferentially extending axially inner part arranged axially inwardly of the axially outer part, and an inclined part connecting between the axially outer part and the axially inner part. The shoulder portion is provided with a plurality of shoulder lateral grooves that extend beyond the tread edge from the shoulder main groove to define a plurality of shoulder blocks. Each of the shoulder lateral grooves has its axially inner end connected to the axially outer part of the shoulder main groove so as to include an outer corner point between the axially outer part and the inclined part. Each of the shoulder lateral grooves has an axially inner portion that extends from the axially inner end with an angle $\alpha 1$ in a range of from 10 to 30 degrees with respect to an axial direction of the tire. Each of the shoulder lateral grooves has cross sectional area increasing toward the tread edge.

In the first aspect of the present invention, the shoulder lateral groove may include the axially inner portion, an axially middle portion connected to the axially inner portion, and an axially outer portion connected to the axially middle portion. The axially middle portion may have an angle $\alpha 2$ with respect to the axial direction of the tire larger than the angle $\alpha 1$ of the axially inner portion. The axially outer portion may have an angle $\alpha 3$ with respect to the axial direction of the tire smaller than the angle $\alpha 2$ of the axially middle portion. The axially inner portion may be provided with a tie-bar.

In the first aspect of the present invention, a boundary between the axially middle portion and the axially outer portion may be located outward a region where the axially inner portion is extended beyond the boundary.

In the first aspect of the present invention, the angle $\alpha 3$ of the axially outer portion may be smaller than the angle $\alpha 1$ of the axially inner portion.

In the first aspect of the present invention, circumferentially adjacent shoulder lateral grooves may be connected through a circumferentially extending shoulder sipe.

In the first aspect of the present invention, the middle portion may be provided with an axially outer middle slot with an axially outer end and an axially inner end. The axially inner end may terminate within the middle portion, and the axially outer end may be connected to the axially inner part of the shoulder main groove so as to include an inner corner point between the axially inner part and the inclined part.

DESCRIPTION OF THE EMBODIMENTS

An embodiment of the present invention will be explained below with reference to the accompanying drawings.

Figure 1:
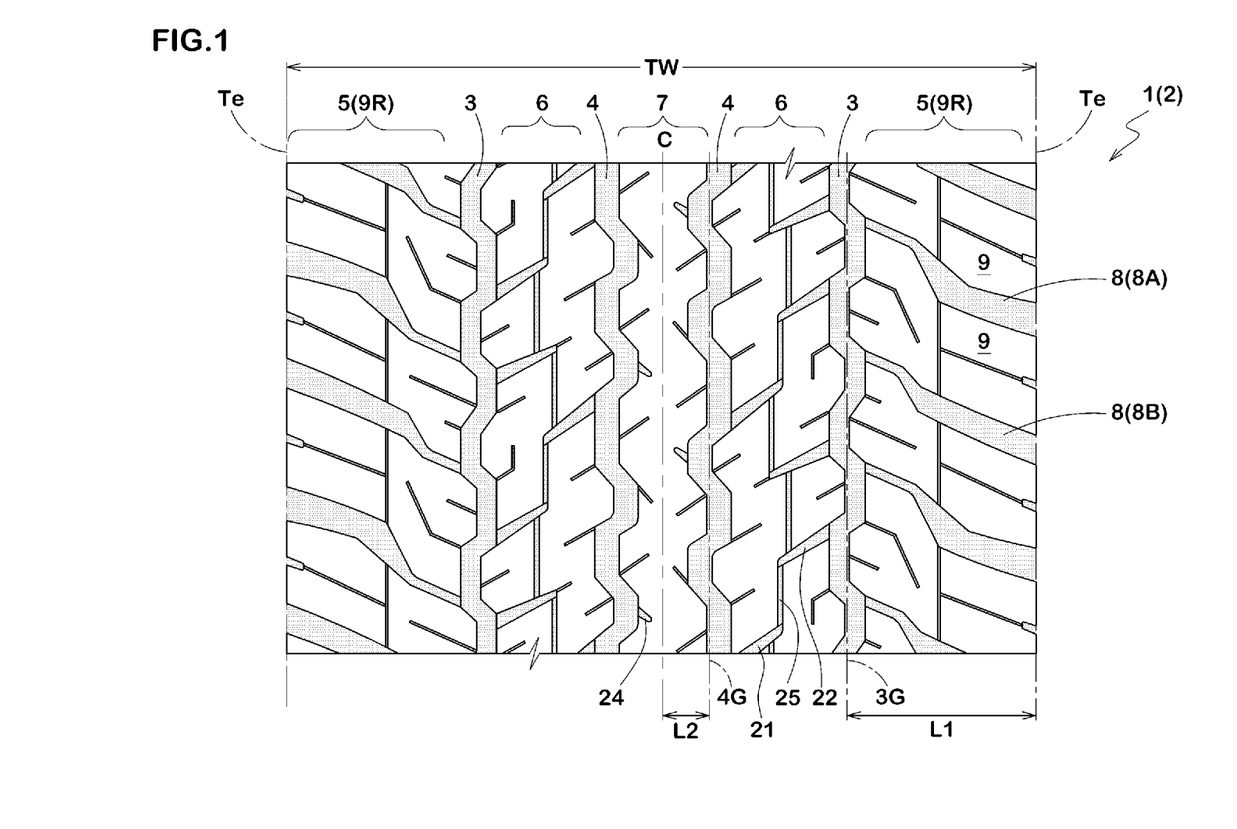
FIG. 1 is a development view of a tread portion of a pneumatic tire according to an embodiment of the present invention.

Referring to FIG. 1, a pneumatic tire in accordance with the present invention includes a tread portion 2 having a pair of tread edges Te, Te. The tread portion 2 is provided with a pair of circumferentially and continuously extending center main grooves 4, 4, and a pair of circumferentially and continuously extending shoulder main grooves 3, 3 arranged axially outwardly of the center main grooves 4. Thus, the tread portion 2 is separated into a plurality of land portions that include a pair of shoulder portions 5 each of which is between adjacent shoulder main groove 3 and the tread edge Te, a pair of middle portions 6 each of which is between adjacent shoulder main groove 3 and center grooves 4, and a center portion 7 between center main grooves 4, 4.

Here, tread edges Te are the axial outermost edges of the ground contacting patch of the tread portion 2 which occurs under a normally inflated loaded condition when the camber angle of the tire is zero. The normally inflated loaded condition is such that the tire is mounted on a standard wheel rim and inflated to a standard pressure and loaded with a standard tire load.

The tread width TW of the tread portion 2 is defined as the width measured under a normally inflated unloaded condition, as the axial distance between the tread edges Te, Te determined as above. The normally inflated unloaded condition is such that the tire is mounted on the standard wheel rim and is inflated to the standard pressure but loaded with no tire load. In this application including specification and claims, various dimensions, positions and the like of the tire refer to those under the normally inflated unloaded condition of the tire unless otherwise noted.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various cold Inflation Pressures" table in TRA or the like.

The standard tire load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

The shoulder portion 5 is provided with a plurality of shoulder lateral grooves 8 that extend beyond the tread edge Te from the shoulder main groove 3 to form a shoulder block row 9R including a plurality of shoulder blocks 9.

Figure 3:
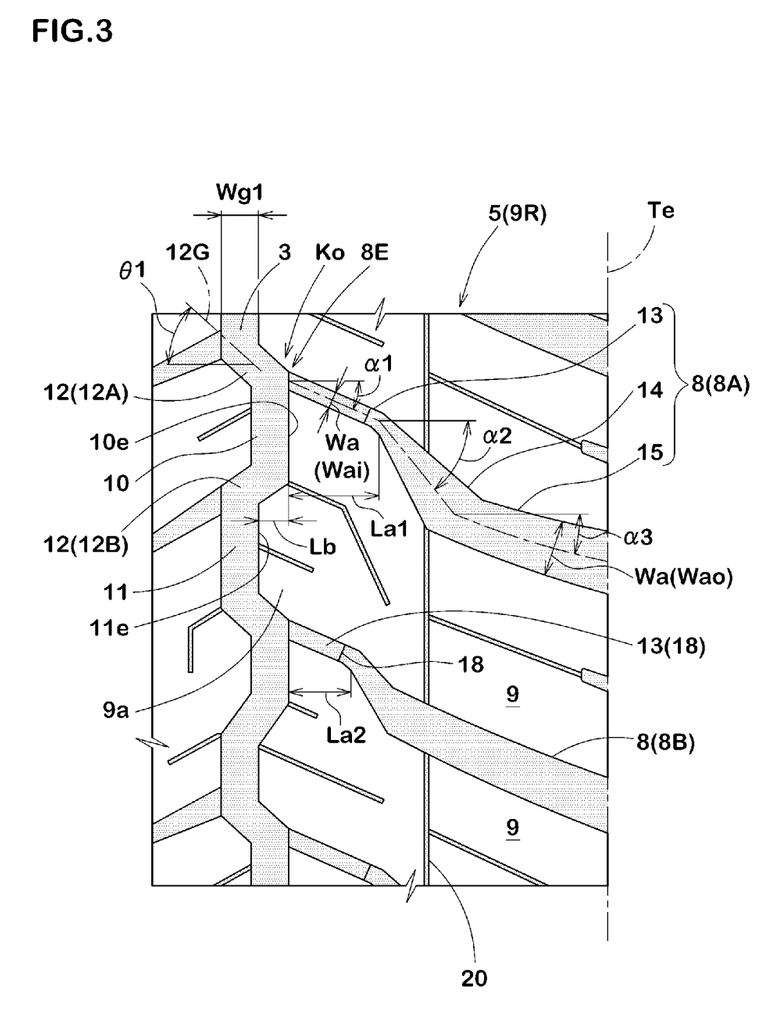
FIG. 3 is a partial enlarged view of a shoulder portion of the tread portion.

FIG. 3 illustrates a partial enlarged view of FIG. 1 including the shoulder portion 5. Referring to FIG. 3, the shoulder main groove 3 extends in a trapezoid wave manner that includes a circumferentially extending axially outer part 10, a circumferentially extending axially inner part 11 arranged axially inwardly of the axially outer part 10, and an inclined part 12 connecting between the axially outer part 10 and the axially inner part 11. Since the inclined part 12 includes a lateral edge component, the inclined part 12 may bite loose muddy road surface, and firmly compresses it to generate large mud shearing force.

The inclined part 12 includes a first inclined part 12A having a first inclination (downward to the right, in this embodiment), and a second inclined part 12B having a second inclination (upward to the right, in this embodiment) opposite to the first inclination. Thus, the shoulder main groove 3 has a repeatedly arranged pitch consisting of one axially outer part 10, one first inclined part 12A, one axially inner part 11, and one second inclined part 12B.

The shoulder main groove 3 has the axial amplitude Lb measured between the axially outer part 10 and the axially inner part 11. The amplitude Lb is preferably in a range of from 0.5 to 0.8 times in relation to the axial groove width Wg1 of shoulder main groove 3. In case that the amplitude Lb is less than 0.5 times the groove width Wg1, it may be difficult to generate large mud shearing force from the shoulder main groove 3. In case that the amplitude Lb is more than 0.8 times the groove width Wg1, it may be difficult to remove mud from the void of the shoulder main groove 3.

In order to effectively improve the advantage above, the inclined part 12 preferably has the groove centerline 12G with an angle θ1 in a range of not less than 30 degrees, more preferably not less than 40 degrees, but preferably not more than 60 degrees, more preferably not more than 55 degrees, with respect to the axial direction of the tire.

The axial groove width Wg1 of the shoulder main groove 3 is preferably set in a range of not less than 4.0%, more preferably not less than 6.0%, but preferably not more than 10.0%, more preferably not more than 8.0% in relation to the tread width TW (shown in FIG. 1). In case that the groove width Wg1 of the shoulder main groove 3 is more than 10.0% the tread width TW, traveling noise and rigidity of the land portions 5 and 6 tend to deteriorate due to its increased groove volume. In case that the groove width Wg1 of the shoulder main groove 3 is less than 4.0% the tread width TW, the shoulder main groove 3 is easily filled up by mud, and mud therein is difficult to removed from there utilizing centrifugal force of the traveling tire. Furthermore, the depth of the shoulder main groove 3 is preferably in a range of from 9.0 to 10.0 mm.

Figure 2:
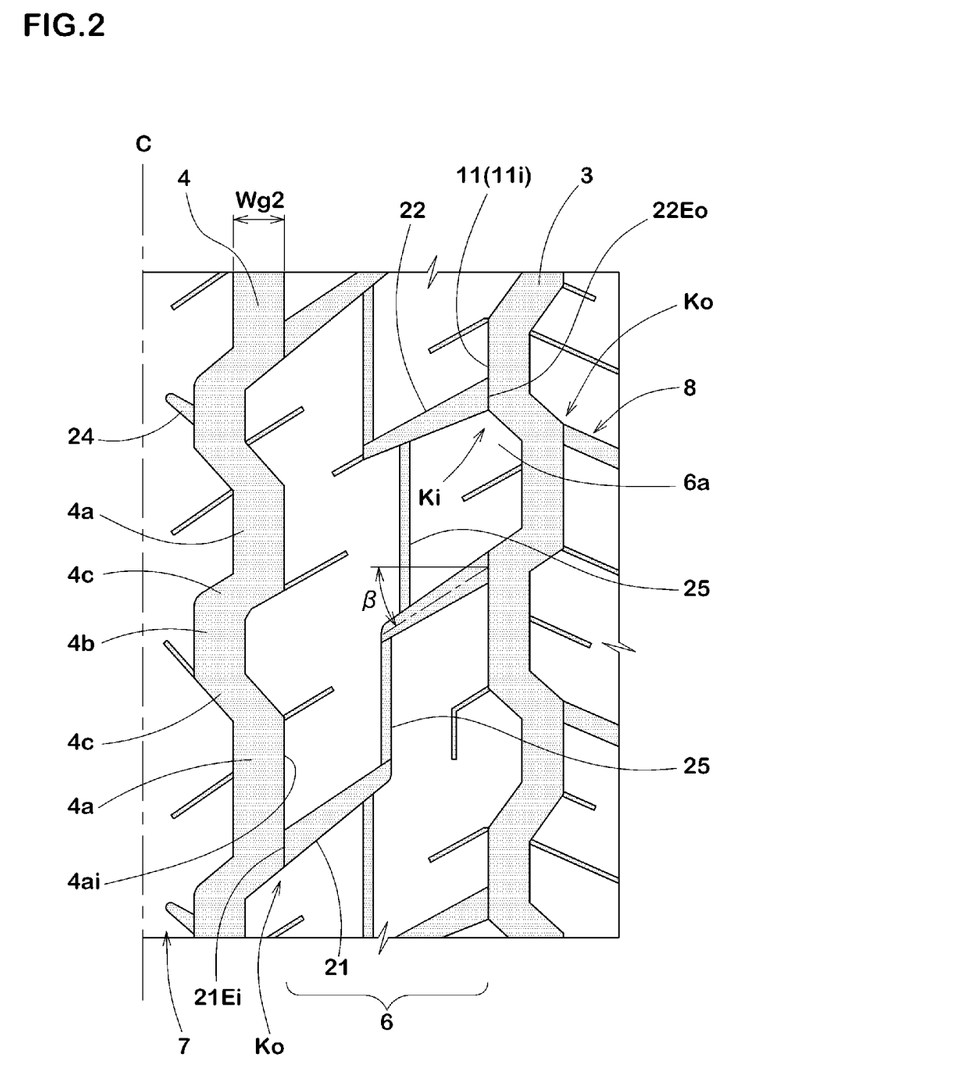
FIG. 2 is a partial enlarged view of a center portion and a middle portion of the tread portion.

Referring to FIG. 2, the center main groove 4 also has approximately the same configuration with the shoulder main groove 3. Namely, the center main groove 4 extends in a trapezoid wave manner that includes a circumferentially extending axially outer part 4a, a circumferentially extending axially inner part 4b arranged axially inwardly of the axially outer part 4a, and an inclined part 4c connecting between the axially outer part 4a and the axially inner part 4b. The center main groove 4 may offer the same advantage with the shoulder main groove 3 as mentioned above. The axial groove width Wg2 of the center main groove 4 is preferably set in a range of from 4.0% to 10.0% in relation to the tread width TW. Furthermore, the depth of the center main groove 4 is preferably in a range of from 9.0 to 10.0 mm.

Referring back to FIG. 1, the location for each of main grooves 3, 4 is determined taking into lateral rigidity of each land portion 5 to 7 so that uneven wear resistance may be improved. Preferably, the axial distance L1 between the tread edge Te and the amplitude centerline 3G of the shoulder main groove 3 is in a range of not less than 15%, more preferably not less than 20%, but preferably not more than 35%, more preferably not more than 30%, in relation to the tread width TW. Preferably, the axial distance L2 between the tire equator C and the amplitude centerline 4G of the center main groove 4 is in a range of not less than 4%, more preferably not less than 4.5%, but preferably not more than 9.0%, more preferably not more than 8.5%, in relation to the tread width TW.

Referring back to FIG. 3, the shoulder lateral groove 8 has its axially inner end 8E that is connected to the axially outer part 10 of the shoulder main groove 3 so as to include the outer corner point "Ko" between the axially outer part 10 and the inclined part 12. Furthermore, the shoulder lateral groove 8 includes an axially inner portion 13 that extends from the axially inner end 8E with an angle α1 in a range of from 10 to 30 degrees with respect to the axial direction of the tire.

In this embodiment, the shoulder lateral groove 8 further includes an axially middle portion 14 and an axially outer portion 15, to form a crank shape. The axially middle portion 14 is connected to the axially inner portion 13 and has the angle α2 with respect to the axial direction of the tire larger than the angle α1 of the axially inner portion 13. Furthermore, the axially outer portion 15 is connected to the axially middle portion 14 and has the angle $\alpha 3$ with respect to the axial direction of the tire smaller than the angle $\alpha 2$ of the axially middle portion. Each of axially inner, middle and outer portions 13, 14 and 15 respectively inclines at the same direction.

Since the shoulder lateral groove 8 is connected to the axially outer part 10 of the shoulder main groove 3 so as to include the outer corner point "Ko", the shoulder block 9 may have a protruding portion 9a facing to the axially inner part 11 of the shoulder main groove with high rigidity due to its large volume. Thus, the vibration on shoulder blocks 9 during traveling may be reduced due to its own high rigidity, whereby noise performance of the tire may improve. Furthermore, since the inclined part 12 and the axially inner portion 13 are smoothly connected each other with the same inclination, mud in the shoulder main groove 3 may be smoothly removed from therein through the inclined part 12 and axially inner part 13 so as to improve mud self-cleaning feature on the shoulder main groove 3.

Furthermore, the shoulder lateral groove 8 gradually comes into contact with the roads from its one end to the other end, due to the angles $\alpha 1$ to $\alpha 3$ as mentioned above. Thus, the impact vibration on the shoulder block 9 generated when it comes into contact with the road is also reduced so that noise performance may be improved. Furthermore, since the shoulder lateral groove 8 has the crank shape, noise is difficult to be transmitted up to the tread edge Te from the shoulder main groove 3 through the shoulder lateral groove 8. In addition, since the shoulder lateral groove 8 has the crank shape as mentioned above, large mud shearing force may be generated.

In case that the angle $\alpha 1$ is more than 30 degrees, traction force generated on muddy roads generated from the axially inner portion 13 tends to be decreased. The angle $\alpha 1$ of the axially inner portion 13 of the shoulder lateral groove 8 is preferably in a range of from 12 to 28 degrees.

Furthermore, the shoulder lateral groove 8 has groove cross sectional area increasing toward the tread edge Te, gradually or in stages. In this embodiment, the changing of groove volume is given by offering the groove width Wa thereof is increasing toward the tread edge Te. Therefore, the shoulder block 9 has relatively high rigidity on its axially inner side that prevents vibration transmission from the center and middle portion 7, 6. Furthermore, the air flow from the shoulder main groove 3 to the tread edge Te through the shoulder lateral groove 8 is regulated due to the small groove cross sectional area of the axially inner end 8E of the shoulder lateral groove 8. Thus, noise performance of the tire is further improved. At the tread edge Te, large mud shearing force may be generated due to its large groove cross sectional area of the shoulder lateral groove 8.

In order to further improve muddy road performance and noise performance, the axially inner portion 13 preferably has the groove width "Wai" in a range of from 30% to 60% in relation to the groove width "Wao" of the axially outer portion 15. In case that the groove width "Wai" or "Wao" is not constant, the average groove width is employed as the groove width for determining the ratio above. In this embodiment, although the axially inner portion 13 has the constant groove width Wai, the axially middle and outer portions 14 and 15 have groove widths increasing toward the tread edge Te, respectively.

The axially inner portion 13 of the shoulder lateral groove 8 is provided with a tie-bar 18 in which its groove bottom rises radially outwardly of the tire so that the groove depth is reduced. The tie-bar 18 connects between adjacent shoulder blocks 9, 9 for enhancing rigidity of the axially inward thereof so that noise performance may be improved. Preferably, the shoulder lateral groove 8 has the groove depth Ht (not shown) on the tie-bar 18 in a range of from 40% to 60% in relation to the depth Hy (not shown) at the axially middle portion 14. Furthermore, the tie-bar 18 preferably has its length measured along the longitudinal direction of the groove in a range of not less than 50% in relation to the length of the axially inner portion 13.

Figure 4:
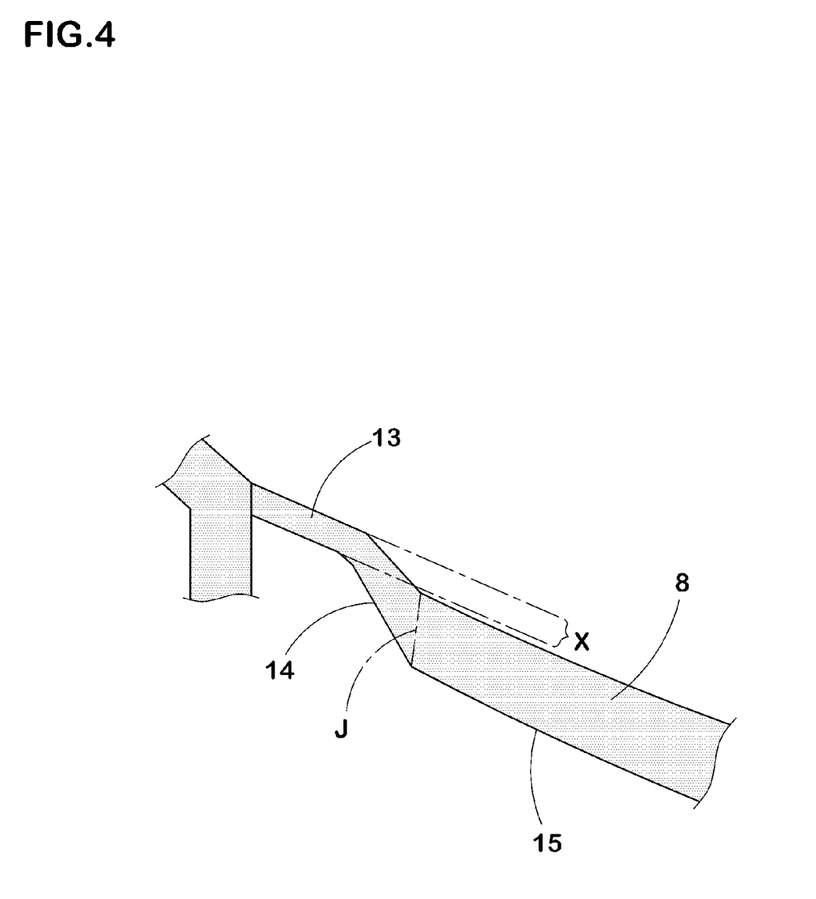
FIG. 4 is an enlarged view of a shoulder lateral groove o the tread portion.

Since the shoulder lateral groove 8 extends in a crank shape manner that helps to disturb the air flow for preventing resonance noise therein. Referring to FIG. 4, a boundary J between the axially middle portion 14 and the axially outer portion 15 preferably is located outwardly of a region "x" where the axially inner portion 13 is extended beyond the boundary J. Thus, resonance noise is further effectively prevented in the shoulder lateral groove 8.

Preferably, the difference $\alpha 2-\alpha 1$ between the angles $\alpha 1$ and $\alpha 2$ is in a range of from 20 to 40 degrees. In case that the difference $\alpha 2-\alpha 1$ between the angles $\alpha 1$ and $\alpha 2$ is less than 20 degrees, the noise disturbing effect tends to deteriorate. In case that the difference $\alpha 2-\alpha 1$ between the angles $\alpha 1$ and $\alpha 2$ is more than 40 degrees, muddy road performance tends to deteriorate. The angle $\alpha 3$ is preferably set smaller than the angle $\alpha 1$, in order to obtain large mud shearing force for improving traction force on muddy roads.

In this embodiment, the shoulder lateral grooves 8 include at least one first shoulder lateral groove 8A having the relatively large average groove width Wa1 (not shown), and at least one second shoulder lateral groove 8B having the relatively small average groove width Wa2 (not shown), which are alternately arranged in the circumferential direction of the tire. Thus, pitch noise due to the shoulder lateral grooves 8 during traveling of the tire may be dispersed in wide frequency range, whereby the peak level on the pitch noise is effectively reduced.

In order to further improve the advantage above while maintaining wear resistance of shoulder blocks 9, the groove width ratio Wa1/Wa2 is preferably in a range of from 1.2 to 2.0.

In this embodiment, the axially inner portion 13 of the first shoulder lateral groove 8A preferably has its axial length La1 larger than the axial length La1 of the axially inner portion 13 of the second shoulder lateral groove 8B, so that respective groove volumes approach each other.

In this embodiment, circumferentially adjacent shoulder lateral grooves 8, 8 are connected through a circumferentially extending shoulder sipe 20. The shoulder sipe 20 straightly extends between the axially inner end 8E of the shoulder lateral groove 8 and the tread edge Te for adjusting rigidity of the shoulder block 9 so that wear resistance may be further improved.

Referring to FIG. 2, the middle portion 6 is provided with a plurality of inner middle slots 21 and outer middle slots 22. Each inner middle slot 21 extends from the center main groove 4 to its axially outer end terminating within the middle portion 6. Preferably, the axially outer end of the inner middle slot 21 is located at a center region in the width direction of the middle portion 6. Each outer middle slot 22 extends from the shoulder main groove 3 to its axially inner end terminating within the middle portion 6. Preferably, the axially inner end of the outer middle slot 22 is located at a center region in the width direction of the middle portion 6.

These middle slots 21, 22 may further generate mud shearing force for improving muddy road performance during traveling, while maintaining rigidity of the middle portion 6. In order to improve self cleaning feature of the slots 21, 22 that easily removes sticky mud from the slots 21, 22 during traveling, the middle slots 21, 22 preferably have tapered ends in which the groove width are gradually decreasing toward its end. Each middle slot 21, 22 is inclined at an opposite direction in relation to the shoulder lateral groove 8, and has the respective angle β in a range of from 10 to 40 degrees in order to further improve noise performance and muddy road performance.

The middle portion 6 is provided with a plurality of middle sipes 25 each of which connects between circumferentially adjacent middle slots (21, 21), (21, 22) or (22, 22). The middle sipes 25 extend around a center region in width direction of the middle portion 6. Preferably, the middle sipes are arranged in a zigzag manner in the circumferential direction of the tire with a pitch that is the same with the center main groove 4 and the shoulder main groove 3.

In this embodiment, the axially outer end 22Eo of the outer middle slot 22 is connected to the axially inner part 11 of the shoulder main groove 3 so as to include an inner corner point "Ki" between the axially inner part 11 and the inclined part 12. Thus, the middle portion 6 may have a protruding portion 6a facing the axially outer part 10 of the shoulder main groove 3 with large volume, whereby the vibration on middle portion 6 during traveling is reduced due to its high rigidity. Thus, noise performance of the tire is further improved.

Similarly, the axially inner end 21Ei of the inner middle slot 21 is connected to the axially outer part 4a of the center main groove 4 so as to include the outer corner point "Ko" between the axially outer part 4a and the inclined part 4c.

The center portion 7 is provided with a plurality of center slots 24 that extend from the center main groove 4 to axially inwardly of the tire without reaching the tire equator C. The center slots 24 help to further increase mud shearing force for improving muddy road performance, while maintaining rigidity of the center portion 7.

The present invention is more specifically described and explained by means of the following Examples and References. It is to be understood that the present invention is not limited to these Examples and embodiments described above.

Comparison Test

Pneumatic tires having a tire size of 285/60R18 with basic tread patterns of FIG. 1 except for details of shoulder lateral grooves shown in Table 1 were made and tested with respect to muddy road performance and noise performance. Major common specifics of tires and test method are as follows.

Details of Test Tires:
Rim size: 18×8.07
Internal pressure: 230 kPa
Tread width TW: 114 mm
Shoulder Main Groove
　Groove width Wg1: 6.70 mm
　Groove depth D1: 10.0 mm
　Zigzag configuration: Trapezoid wavy manner
　Zigzag amplitude Lb: 4.15 mm
Center Main Groove
　Groove width Wg2: 8.03 mm
　Groove depth D2: 10.0 mm
　Zigzag configuration: Trapezoid wavy manner
　Zigzag amplitude Lb: 6.01 mm
Shoulder Lateral Groove
　Groove depth Hy: 10.0 mm
　Groove depth Ht on tie-bar: 5.0 mm
　Tie-bar length: 50% of axially inner portion of shoulder Lateral Groove Muddy Road Performance Test:

A four wheel drive car with a displacement of 4,600 cc provided with test tires as four wheels was driven by a professional test driver on loose muddy road, and evaluated traction force of each test tire according to his feeling. The results are shown with a score of 100 representing a value in Ref.1. The larger the value, the better the performance is.

Noise Performance Test:

The test car provided with test tires was coasted at a speed of 53 km/h in a straight test course, and the maximum noise sound level in dB(A) was measured with a microphone set at 1.2 meter height from the road surface and 7.5 meter sideways from the running center line in the midpoint of the course. The results are indicated in Table 1 by an index based on Ref.2 tire being 100, wherein the larger the index number, the better the noise performance is.

Remarks

In table-1, "connecting position between shoulder main groove and shoulder lateral groove" are shown as follows:

"outer corner point" means that the axially inner end of the shoulder lateral groove is connected to the axially outer part of the shoulder main groove so as to include the outer corner point between the axially outer part and the inclined part;

"Inclined part" means that the axially inner end of the shoulder lateral groove is connected to the inclined part of the shoulder main groove; and "Between outer corner points" means that the axially inner end of the shoulder lateral groove is connected to the axially outer part in between adjacent outer corner points.

In case that the shoulder lateral groove is configured to a straight manner, "Groove width ratio Wai/Wao" in Table 1 is shown as the ratio of the groove width "Wai" at the axially inner end of the shoulder lateral groove to the groove width "Wao" at the axially outer end of the shoulder lateral groove.

In table-1, "Position of boundary between axially middle portion and outer portion" are shown as follows:

"Outside" means that the boundary between the axially middle portion and the axially outer portion is located outside the region "x" (shown in FIG. 3) where the axially inner portion is extended beyond the boundary; and "Inside" means that the boundary between the axially middle portion and the axially outer portion is located inside the region "x" as mentioned above.

Each test tire has the shoulder lateral groove having its groove cross sectional area increasing toward the tread edge.

Test results are shown in Table 1

TABLE 1

| Shoulder lateral groove spec. | Ref. 1 | Ref. 2 | Ex. 1 | Ex. 2 | Ex. 3 | Ex. 4 | Ref. 3 | Ref. 4 | Ex. 5 | Ex. 6 | Ex. 7 |
|---|---|---|---|---|---|---|---|---|---|---|---|
| Connecting position between shoulder main groove and shoulder lateral groove | Outer corner point | Outer corner point | Outer corner point | Outer corner point | Outer corner point | Outer corner point | Between outer corner points | Inclined part | Outer corner point | Outer corner point | Outer corner point |
| Groove configuration | Straight | FIG.3 | FIG.3 | FIG.3 | FIG.3 | FIG.3 | FIG.3 | FIG.3 | FIG.3 | FIG.3 | FIG.3 |
| Angle α1 (deg.) | 0 | 40 | 10 | 30 | 30 | 30 | 30 | 30 | 30 | 30 | 30 |
| Angle α2 (deg.) | 0 | 50 | 20 | 50 | 50 | 40 | 50 | 50 | 50 | 45 | 55 |
| Angle α3 (deg.) | 0 | 40 | 8 | 25 | 35 | 25 | 25 | 25 | 25 | 25 | 25 |
| Groove width ratio Wai/Wao (%) | 45 | 45 | 45 | 45 | 45 | 45 | 45 | 45 | 45 | 30 | 60 |

TABLE 1-continued

| Shoulder lateral groove spec. | Ref. 1 | Ref. 2 | Ex. 1 | Ex. 2 | Ex. 3 | Ex. 4 | Ref. 3 | Ref. 4 | Ex. 5 | Ex. 6 | Ex. 7 |
|---|---|---|---|---|---|---|---|---|---|---|---|
| Position of boundary between axially middle portion and outer portion | None | Outside | Outside | Outside | Outside | Inside | Outside | Outside | Outside | Outside | Outside |
| Tie-bar on axially inner portion | Absence | Absence | Absence | Absence | Absence | Absence | Absence | Absence | Presence | Absence | Absence |
| Muddy road performance (Score) | 100 | 80 | 101 | 96 | 88 | 95 | 88 | 89 | 95 | 89 | 100 |
| Noise performance (Index) | 82 | 100 | 93 | 94 | 97 | 86 | 92 | 90 | 99 | 96 | 88 |

From the test results, it was confirmed that Example tires in accordance with the present embodiment of the invention can be effectively improved muddy road performance while maintaining noise performance.

What is claimed is:

1. A pneumatic tire, comprising:
a tread portion provided with;
a pair of circumferentially and continuously extending center main grooves to define a center portion therebetween;
a pair of circumferentially and continuously extending shoulder main grooves disposed axially outwardly of the center main grooves to define a middle portion between the center main groove and the shoulder main groove, and a shoulder portion between the shoulder main groove and a tread edge, in each side of a tire equator, the shoulder main grooves extending in a trapezoid wave manner that comprises a circumferentially extending axially outer part, a circumferentially extending axially inner part arranged axially inwardly of the axially outer part, and an inclined part connecting between the axially outer part and the axially inner part;
the shoulder portion being provided with a plurality of shoulder lateral grooves that extend beyond the tread edge from the shoulder main groove to define a plurality of shoulder blocks; and
each of the shoulder lateral grooves having an axially inner end connected to the axially outer part of the shoulder main groove so as to include an outer corner point between the axially outer part and the inclined part, each of the shoulder lateral grooves having an axially inner portion that extends from the axially inner end with angle $\alpha 1$ in a range of from 10 to 30 degrees with respect to an axial direction of the tire, each of the shoulder lateral grooves having a cross sectional area increasing toward the tread edge, wherein the shoulder lateral groove further comprises:
an axially middle portion connected to the axially inner portion and having an angle $\alpha 2$ with respect to the axial direction of the tire, wherein the angle $\alpha 2$ is larger than the angle $\alpha 1$ of the axially inner portion, and
an axially outer portion connected to the axially middle portion and having an angle $\alpha 3$ with respect to the axial direction of the tire, wherein the angle $\alpha 3$ is smaller than the angle $\alpha 2$ of the axially middle portion, wherein each of the inner, middle and outer portions inclines in a same direction, and
a boundary between the axially middle portion and the axially outer portion is located outside a region where the axially inner portion is extended beyond the boundary.

* * * * *